United States Patent [19]

Wen et al.

[11] Patent Number: 4,931,799
[45] Date of Patent: Jun. 5, 1990

[54] SHORT-RANGE RADAR TRANSCEIVER EMPLOYING A FET OSCILLATOR

[75] Inventors: Cheng P. Wen, Mission Viego; Richard T. Hennegan, Torrance, both of Calif.

[73] Assignee: Hughes Aircraft Company, Los Angeles, Calif.

[21] Appl. No.: 342,850

[22] Filed: Apr. 24, 1989

[51] Int. Cl.$^5$ .......................... G01S 13/34; H04B 1/28
[52] U.S. Cl. .................................... 342/110; 342/175; 455/87; 455/326
[58] Field of Search ................ 342/175, 110, 70, 136, 342/200; 455/86, 87, 326

[56] References Cited

U.S. PATENT DOCUMENTS

| | | | |
|---|---|---|---|
| 2,927,319 | 3/1960 | Bradley | 455/86 X |
| 4,255,730 | 3/1981 | Sekine et al. | 342/175 X |
| 4,541,120 | 9/1985 | Szabo | 455/86 |
| 4,736,454 | 4/1988 | Hirsch | 455/129 |
| 4,742,354 | 5/1988 | Wen et al. | 342/188 |
| 4,857,935 | 8/1989 | Bates | 342/128 |

FOREIGN PATENT DOCUMENTS 0111799  9/1979  Japan .................................... 342/104

OTHER PUBLICATIONS

Terrial Cutsinger, "Solid State Local Oscillator Sources for Millimeter and Sub-Millimeter Wave Applications", Conference Digest, 12th International Conference on Infrared and Millimeter Waves, Dec. 14–18, 1987, Orlando, FL., pp. 48a–48b.
Remy LeBlanc et al., "GaAs Monolithic Circuit for FMCW Radars", IEEE International Microwave Symposium Digest, vol. 1, May 25–27, 1988, New York, NY, pp. 99–101.

Primary Examiner—Gilberto Barrón, Jr.
Attorney, Agent, or Firm—Terje Gudmestad; Paul M. Coble; Wanda K. Denson-Low

[57]  ABSTRACT

A field effect transistor FMCW radar transceiver for short-range target detection, employs a varactor-tuned, gallium arsenide field effect transistor, voltage-controlled oscillator in the dual role of the transmitter signal source and the local oscillator. The radar transceiver is capable of operating at low IF frequencies for short range, which can be less than 30 feet, target detection.

14 Claims, 3 Drawing Sheets

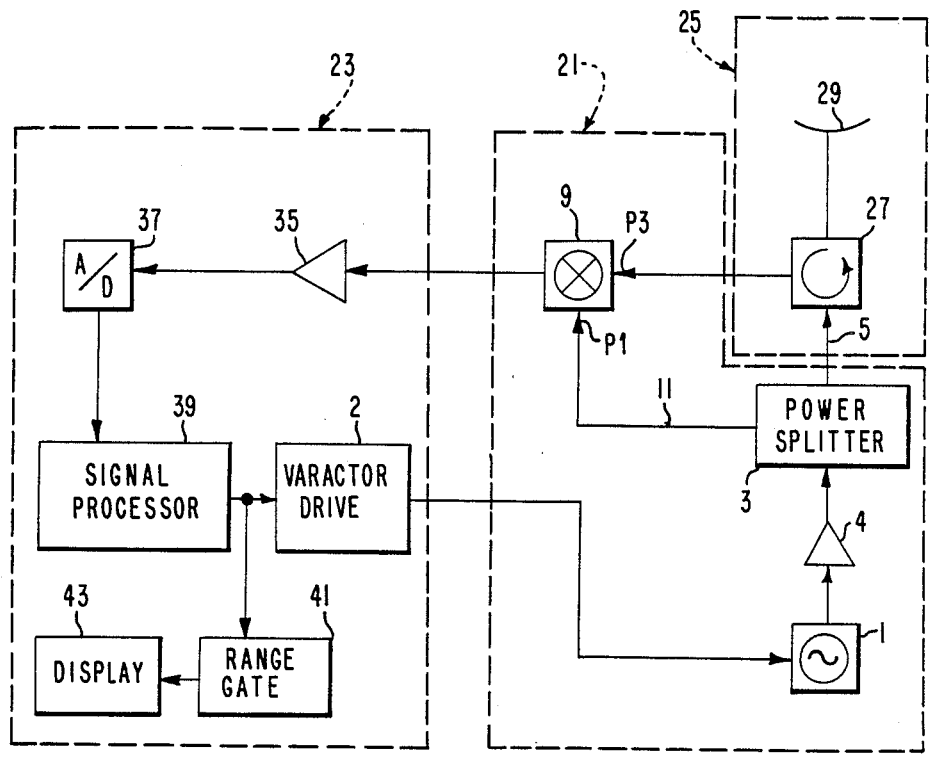
Fig. 7.
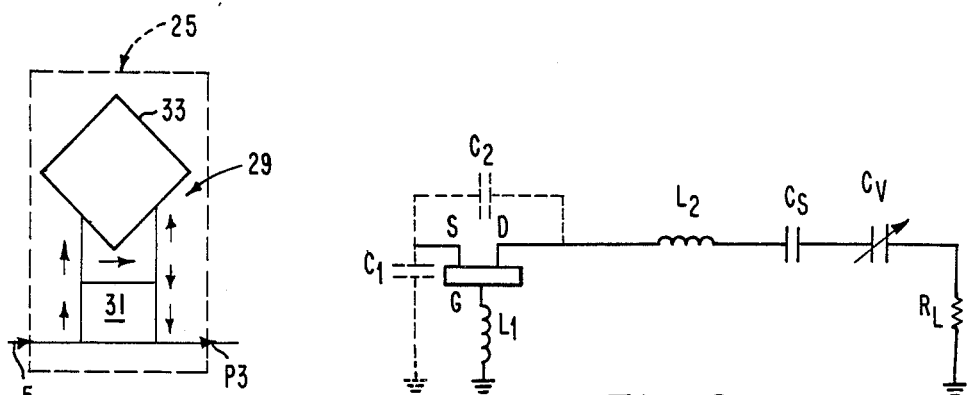
Fig. 8.
Fig. 9.

SHORT-RANGE RADAR TRANSCEIVER EMPLOYING A FET OSCILLATOR

BACKGROUND OF THE INVENTION

1. Field of the Invention

This invention relates to radar, and more particularly to radar transceivers for short-range target detection.

2. Description of the Prior Art

Frequency modulated continuous wave (FMCW) radar systems using solid state components are commonly found in short-range radar detection applications. Prior art FMCW radar transceivers have been based on microwave power sources such as a vacuum tube, typically a kylstron, or a transferred electron device such as a Gunn diode. These conventional approaches do not lend themselves to monolithic circuit fabrication techniques which are ideal for high production implementation.

In U.S. Pat. No. 4,742,354 to Cheng P. Wen, et al., assigned to the assignee of this invention, the present applicant describes a radar transceiver employing a transmitter oscillator, a directional coupler for splitting the oscillator signal into two signals in quadrature phase relationship, and a single antenna for radiating the signals as a circularly polarized waveform. Portions of the circularly polarized waveform that are reflected back are received by the same antenna. The directional coupler combines the two components of the circularly polarized wave into a signal which is down-converted into a signal of intermediate frequency by a mixer. The radar transceiver is hybrid integrated and is fabricated on a single substrate such as a Duroid substrate. A voltage controlled Gunn oscillator is suggested as the transmitter oscillator which, as noted above, does not lend itself to monolithic circuit fabrication techniques. Specific fabrication techniques are not described with respect to the oscillator.

Background art described in this patent includes:
(1) radar transceivers having separate transmitter and receiver antennas;
(2) those having a single antenna in which the transmitted and returned signals are directed through a circulator; and
(3) those having a single antenna employing a 3-dB coupler for signal coupling at the antenna.

All such systems, as presently known, typically include conventional oscillators such as a klystron or a Gunn oscillator. A FET oscillator such as a GaAs FET oscillator is not employed.

In fact, in a paper entitled "Solid State Local Oscillator Sources for Millimeter and Sub-Millimeter Wave Applications", by Terrial Cutsinger, presented at the 12th International Conference on Infrared and Millimeter Waves, Dec. 14-18, 1987, Orlando, Fla., it was stated:

"Solid state devices such as FET's and IMPATT dodes are capable of generating power at millimeter-wave frequencies. Both of these however, have inherent problems which limit their usefulness. FET oscillators provide relatively low power and produce high 1/F noise. Additionally, they are limited to the lower millimeter-wave frequencies, but IMPATTS exhibit high AM noise which degrades system noise performance."

In this paper, Gunn device oscillators were stated to provide a reliable solution to the problems inherent to FET and IMPATT oscillators, pointing to their sufficiency of RF power, low AM and FM noise, and the ability to drive a mixer up to 110 GHz without frequency multiplication.

SUMMARY OF THE INVENTION

This invention provides a FET oscillator-based FMCW radar transceiver which is ideally suited for short-range target detection applications. The radar transceiver comprises a FET voltage controlled oscillator and a balanced mixer. One embodiment employs separate microstrip transmitting and receiving antennas, and a second embodiment employs a circulatorless, circularly polarized microstrip integrated antenna. A digital signal processor with a range gate receives a digitized IF signal and is employed to identify the targets and the target velocities. As noted above, the FET oscillator was considered unsuitable for short-range radar applications because of the excessive up-converted 1/f noise. The self-correlation nature of this FMCW radar transceiver combined with the AM noise suppression of the balanced mixer enables the fabrication of a low-cost radar sensor using well-established monolithic integrated circuit technology.

This solid state FMCW radar transceiver for short-range applications provides improvements over prior art arrangements for such applications because it offers the advantages of durability, small size, lightweight, and is adaptable to low-cost manufacturing while still providing or retaining the ability to penetrate fog, dust, and smoke.

The radar transceiver system is a simple motion detector if the transmitter frequency remains constant. In a preferred embodiment, the radio frequency (RF) transmitter power and the local oscillator (LO) drive for the balanced mixer stage are provided by a common voltage controlled oscillator (VCO) which is a FET oscillator. This microwave integrated circuit FMCW radar transceiver operates with a circularly polarized waveform. Such a waveform is particularly attractive for automotive "rear-view mirror" and short-range collision avoidance applications because the antenna required uses directional couplers in place of non-reciprocal elements such as circulators, which are required in conventional radars.

BRIEF DESCRIPTION OF THE DRAWINGS

The invention will be better understood by reference to the following descriptive disclosure when considered in conjunction with the accompanying drawings, in which:

FIG. 7 is a block diagram of a presently preferred embodiment of this invention;

FIG. 8 schematically depicts a conformal dual-feed circularly polarized microstrip antenna; and FIG. 9 schematically illustrates a presently preferred GaAs FET VCO.

DESCRIPTION OF THE PREFERRED EMBODIMENTS

The FET based microwave monolithic integrated circuit is ideally suited for short-range applications where durability, low cost, compact size, light weight, and high volume production are essential. However, in spite of these advantages, this promising technology has not been incorporated into radar sensor designs because the FET oscillator was considered to be too noisy for any radar application. We have determined that the noise characteristics of a FET oscillator will not cause serious performance degradation if a single RF signal source is used in a short-range radar transceiver. Consequently, the FET based monolithic integrated radar transceiver is ideal for use in short-range applications.

Figure 1:
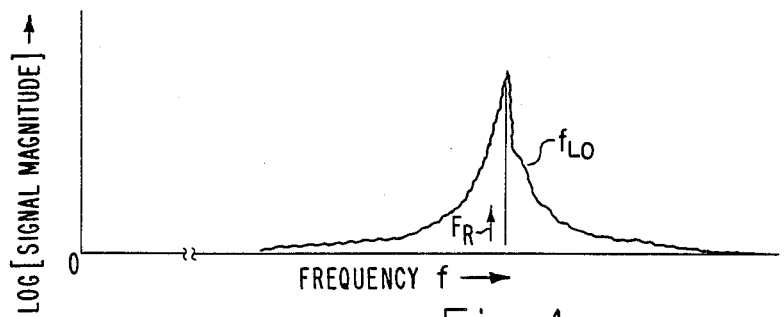
FIG. 1 is a frequency domain display of a local oscillator signal.

The Gunn diode (transferred electron device) oscillator is traditionally used in radar sensor applications because of its "spectral purity." The misleading logic behind this traditional thinking can be illustrated by the frequency domain display (FIG. 1) of the local oscillator signal, $f_{LO}$ and the returned signal $f_R$ of a superheterodyne receiver (FIG. 1). The intermediate frequency ($f_{IF}=f_{LO}-f_R$) of a typical short-range FMCW or Doppler radar is so small that the returned signal appears to be obscured by the 1/f noise sideband of the local oscillator. The 1/f noise originates from the deep level traps associated with the surface states of a semiconductor device and this low frequency noise up-converted to the RF frequency by the nonlinear properties inherent in an oscillator shows up as the noise sideband. The large surface-to-volume ratio of a FET device structure leads to strong 1/f noise sidebands near the oscillator frequency. The FET oscillator is, therefore, regarded as unsuitable for short-range radar sensor applications based on these noise considerations. This widely accepted concept is correct only under the circumstances where the radar transmitter signal source and the receiver local oscillator power source are uncorrelated.

Figure 2:
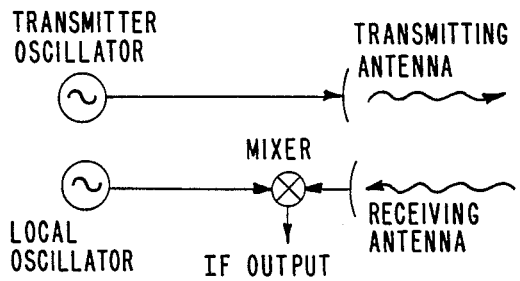
FIG. 2 is a schematic representation of a prior art pulsed radar transceiver.
Figure 3:
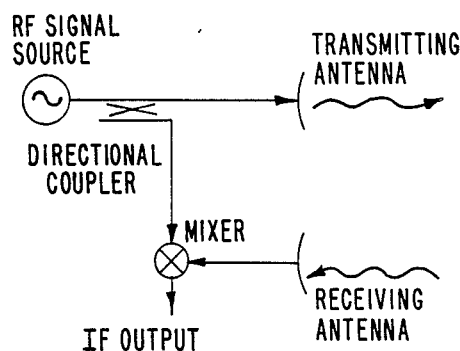
FIG. 3 schematically depicts a FMCW radar transceiver having a single RF signal source.

The circuit schematic diagram of such a prior art pulsed radar transceiver is shown in FIG. 2. Most long-range ground-based and airborne radars fall into this category because the power levels required for transmitter and receiver operations are significantly different, up to six orders of magnitude in some cases. The noise argument presented here is no longer valid once an added constraint is placed between the transmitted and the received signals. For instance, a single RF signal source serves the dual role of transmitter power source and local oscillator in a FMCW radar transceiver or a Doppler radar sensor shown in FIG. 3. A closer examination of the meaning of the frequency domain display in FIG. 1 must be made in order to reevaluate the effect of the added constraint on the performance characteristics of these single signal source radar transceivers.

Figure 4:
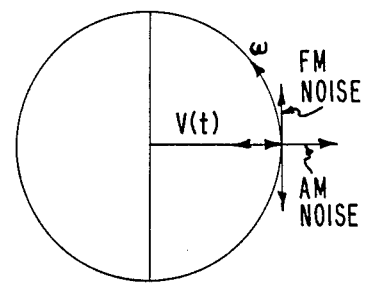
FIG. 4 is a diagram depicting a rotating vector showing the phase relationship of AM and FM noise.

The RF signal of an oscillator can be represented by a rotating vector v(t) in FIG. 4. The vector is rotating in the counterclockwise direction with an angular frequency or velocity $\omega$. The fluctuation in the amplitude of the vector v(t) is the AM noise, while the uncertainty in the angular velocity constitutes the FM noise of the signal source. It is clear from this vectorial representation that the AM noise and the FM noise of an oscillator are orthogonal to each other and that they are uncorrelated.

It is important to understand how the noise sideband of an oscillator affects the performance of a radar with a single RF signal source. For instance, the IF output of a balanced mixer in such a radar transceiver is approximately $S_{IF}=A \cos(2\delta\omega\tau)$ if the signal source is $v(t)=\cos(\omega_o+\delta\tau)t$ and the round-trip time of the returned signal is $2\tau$. $\delta\omega$ is defined here as the frequency fluctuation of the RF signal source. The IF signal drops to zero when $2\delta\omega\tau$ approaches $\pi/2$; i.e., $2\delta\cap =\pi/4\tau$ for the performance of the transceiver to be seriously affected. The short-range radar with a target less than 30 feet from the transceiver is affected by noise sidebands 4.16 MHz or further away from the average frequency $\cap_o 2\pi$. This frequency is far higher than the typical IF frequency of the transceiver which is in the kilohertz (KHz) range. If the sideband noise is indeed 1/f in nature, the effect of the oscillator sideband is likely to be at least three orders of magnitude less than what is expected based on the conventional thinking. It is evident that a FET-based monolithic integrated radar is acceptable for short-range radar applications where the target is merely a few feet away.

Figure 5:
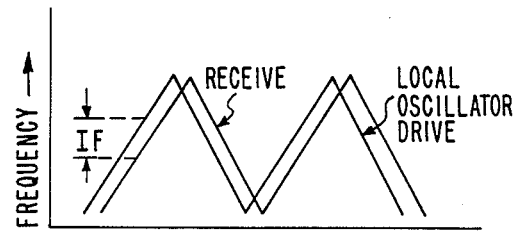
FIG. 5 depicts transmitted and received triangular FMCW waveforms and their frequency difference in time.

Target ranging and velocity can be obtained through the use of a triangular FMWC waveform (FIG. 5) with a predetermined modulation rate. The returned signal is displaced in frequency from the instantaneous frequency of the local oscillator drive, as seen in FIG. 5, if a triangular signal is used to modulate the frequency of the oscillator.

Figure 6:
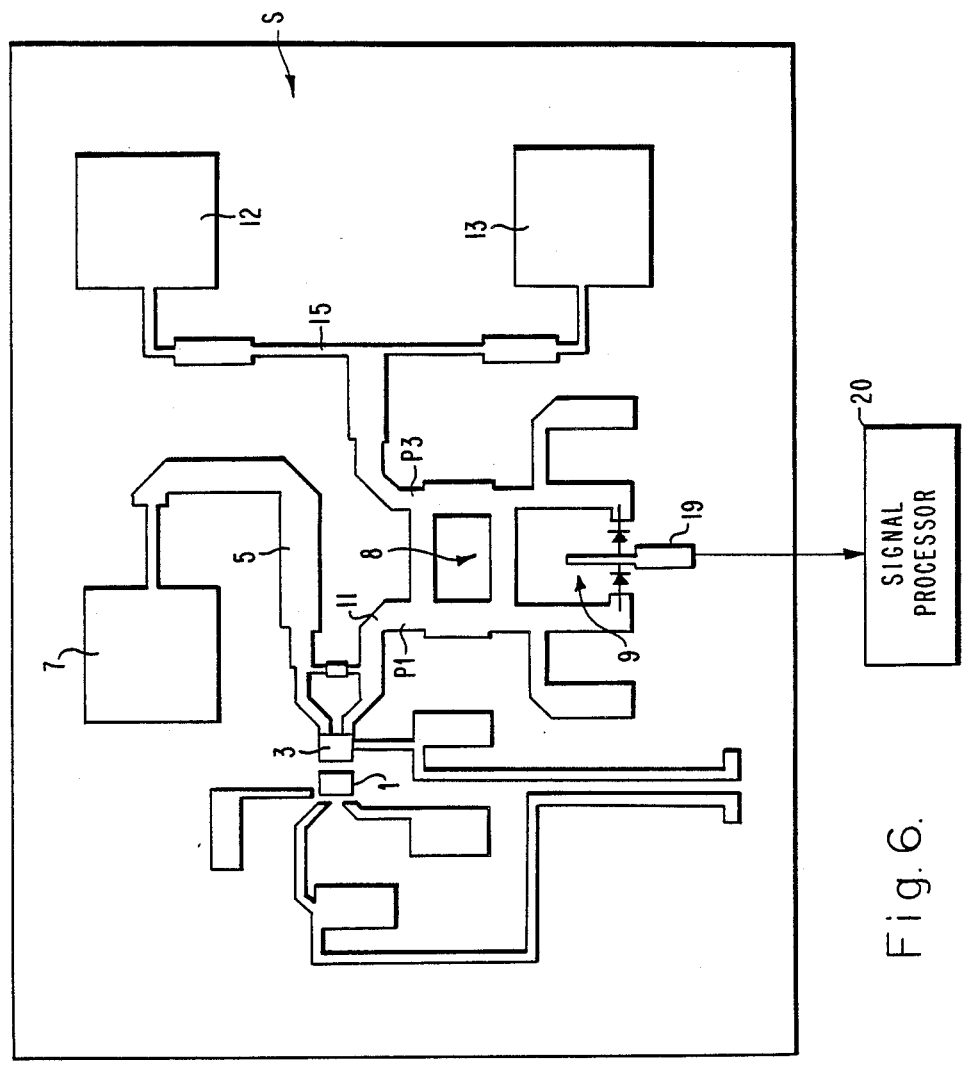
FIG. 6 is a drawing to an enlarged scale of the platform of a hybrid integrated short-range radar transceiver circuit which has been constructed and tested, employing a FET oscillator, and which embodies the principles of this invention.

FIG. 6 illustrates a radar transceiver module which has been implemented and tested using all microstrip technology. A combination of localized multi-dose, multi-energy ion implantation, metal/dielectric thin film deposition, fine-line lithography and other techniques for planar microwave integrated circuit manufacturing were employed to fabricate the entire radar transceiver of FIG. 6 on substrates. In FIG. 6, a voltage-controlled (varactor tuned) GaAs FET oscillator 1 is employed as the transceiver power source. It functions both as the transmitter power source and as the local oscillator. The oscillator signal may be continuous or pulsed; however, the continuous signal is preferred. The oscillator output signal is coupled into a power splitter 3 such as a directional coupler or a hybrid coupler which splits the signal into first and second signal portions, one signal being of sufficient power to drive a mixer and the other signal being the signal to be transmitted.

The signal to be transmitted, say the first signal, is coupled via a circuit 5 to a transmitter antenna 7. The second signal is coupled to a Schottky diode, 3dB branch line single balanced mixer 9, via a circuit 11. This mixer 9 is a balanced mixer and is employed because it has the necessary local oscillator AM noise suppression characteristics and it can be easily implemented in the microstrip configuration. A 3dB coupler 8, used in conjunction with the Schottky diode pair, forms a balanced mixer 9 driven by the local oscillator signal at port P1 and the returned signal from port P3 from antennas 12 and 13, which are connected in parallel, by a circuit 15.

Varactor tuning is the most desirable approach for FMCW radar transceivers because it provides good RF tuning bandwidth and time modulation slew rates. The circuit elements described here share the same GaAs monolithic integrated circuit technology, and they are easily integrated onto a common substrate.

In this implementation, a voltage-controlled (varactor tuned) GaAs FET oscillator 1 has been employed as the transceiver power source despite the conventional belief that the up-converted 1/f noise renders it unsuitable for radar sensor applications. In a single power source FMCW radar, only the noise sideband in the frequency range greater than or equal to the reciprocal of four times the round-trip time delay of the signal is of concern. The sensitivity of a radar sensor is dependent on the auto-correlation of the power source with a round-trip signal time delay equal to $2\tau$ ($\tau$ is the time required for the transmitted signal to reach the target). For instance, the noise sideband affecting the signal-to-noise ratio of a target at 1 meter from the transceiver antenna is the FM noise of the oscillator 40 MHz away from the instantaneous frequency. Based on this analysis, as discussed hereinbefore, the noise performance of a field effect transistor voltage controlled oscillator will be adequate for a short-range radar sensor.

The hybrid integrated radar transceiver circuit of FIG. 6 was tested. The IF output at terminal 19 was coupled to a signal processor 20. Tests were conducted for target range cutoff and indications of increases and decreases in range. The 3dB branch line single balanced mixer functioned satisfactorily as an AM noise suppressor, and FM noise did not interfere with range sensing.

FIG. 7 illustrates a presently preferred embodiment of this invention. This embodiment comprises a microwave transceiver module 21, which is fabricated on a GaAs substrate, and a signal processor module 23, which is separately fabricated. Here again, the voltage-controlled GaAs FET oscillator 1 has a dual role, functioning as the transmitter signal source and the local oscillator. Again, the output of the oscillator 1 is split by means of a power splitter 3, which is coupled to the oscillator by an AM noise suppression amplifier 4. One output 5 of the power splitter 3 is coupled to an antenna module 25. The second output 11 of the power splitter 3 is coupled to a port Pl of the mixer 9 which, while differently illustrated, is functionally similar to that described in connection with FIG. 6. The antenna module 25 comprises a diplexer 27 to which the transmitter signal from the power splitter 3 is coupled. The diplexer 27, in turn, is coupled to a single antenna 29. The antenna module 25 can be a single antenna 29 fed by a diplexer 27 functioning as a circulator, or two separate antennas (seen in FIG. 6), or a circularly polarized antenna (seen in FIG. 8).

When antenna module 25 comprises a planar integrated antenna such as the conformal dual-feed, circularly polarized microstrip antenna 29 of FIG. 8, a diplexer 27 is not required. This antenna operates with a circularly polarized waveform and is suitable for use with the FET-based monolithic radar transceiver. The antenna 29 comprises a microstrip branch line coupler 31 functioning as a polarizer, which in this case is a 3dB hybrid coupler, and a dual feed antenna 33, which is a microstrip antenna patch. The transmitter signal on circuit 5 is coupled into the left-hand branch of the branch line coupler 31, and the received signal is coupled from the antenna 33 into the right-hand branch of the branch line coupler 31. The received or returned signal from the microstrip antenna patch 33 exits the branch line coupler 31 at its right-hand port and is coupled to the port P3 of the mixer 9.

In this application, the RF power from the transmitter power source 1 is divided into two parts which are equal in magnitude and 90° out of phase, by the 3dB branch line coupler 31. The antenna 33 is configured as a single element, square-patch resonant microstrip, the circularly polarized radiation of which originates from the excitation of two orthogonal modes on two adjacent edges of the square patch from the outputs of the branch line coupler 31. Alternatively, a "fish bone" antenna with radiating elements arranged in the orthogonal directions can be employed. The sense of polarization of the returned signal is opposite to that of the transmitted signal upon reflection by a target. The polarization function of the branch line coupler 31 recombines the horizontal and vertical components of the returned signal at the mixer input terminal P3. Little or no return signal should go back toward the VCO1 because of phase cancellation provided by the polarization function of the coupler 31. Similarly, the polarization function minimizes the possibility of any direct RF signal from a similar radar system from reaching the sensitive receiver balanced mixer 9. The balanced mixer 9 down-converts the return signal to an intermediate frequency (IF) output at terminal 19 for further signal processing.

The signal processing module 23 is used to determine the range and the range rate of targets by analyzing the IF power output of the balanced mixer 9 in the monolithic integrated microwave transceiver module 21. The signal processing module comprises a linear amplifier 35 which amplifies the intermediate frequency signal from the mixer 9, an analog-to-digital converter 37, and a digital processor 39 comprising a microprocessor and a fast Fourier transform chip to handle the demodulated signal waveform. A varactor drive 2, referred to in the discussion with respect to FIG. 6, forms part of the signal processor module 23, in this illustration. Its output is connected to the voltage-controlled oscillator 1 and provides frequency tuning of the oscillator. The varactor drive 2 is synchronized with the digital processor 39. A digital range gate 41 receives the output of the digital processor 39. The digital range gate 41 is preferred because it provides better range resolution and defines the range of radar sensor operation. The signal-processing module 23 also controls the waveform of the radar sensor by providing the timing and the modulation signal to the VCO 1 via the varactor drive 2 in the transceiver. Output of the signal processor 39 is coupled via the range gate 41 to a display unit 43, or in the alternative, to a data storage module (not shown). This monolithic FMCW radar sensor is ideal for high-volume, high-rate manufacturing using microwave monolithic circuit technology.

The up-conversion of the 1/f noise normally can be excessive for a field-effect transistor oscillator. The 1/f noise is up-converted due to the non-linear characteristics of the oscillator. It becomes the sideband noise close to the oscillator frequency $f_0$. If such an oscillator 1 is used as a local oscillator in a mixer down-converter in a system employing a separate transmitter power oscillator, the sideband noise shows up as the IF noise corresponding to the difference between the instantaneous frequency $f_0$ of the local oscillator and the frequency of the returned signal. This high noise background of the IF output causes undesirable degradation of the receiver signal-to-noise ratio and sensitivity.

However, a FMCW radar sensor according to this invention employs a single oscillator 1 to serve as the transmitter power source as well as the receiver local oscillator. In such a single oscillator source system, the noise output of the mixer intermediate frequency is a measure of the uncertainty of the correlation of the oscillator with a round-trip time delay $2\tau$, where $2\tau$ is the round-trip time of the signal to and from the target. The noise sideband of the oscillator at frequencies approximately $\frac{1}{2}\tau$ is the only factor affecting the signal-to-noise ratio of the FMCW radar transceiver, and the up-converted 1/f noise is not a significant factor in system performance. If $\tau$ is small, that is less than 1000 nanoseconds (corresponding to 500 foot target range), the sideband noise at 250 KHz or further away will affect the system operation, while the low frequency noise (250 KHz from the carrier) will have no degradation effect.

Hyper-abrupt pn junction varactor diodes fabricated using high energy localized implantation and rapid thermal annealing techniques are compatible with FET based monolithic integrated circuits. Varactor tuning is the most desirable approach for FMCW radars because it provides good RF tuning bandwidth at high modulation slew rates. The 1/f noise up-conversion by the nonlinear characteristics inherent in a FET oscillator is not detrimental to radar transceiver function at short ranges. In the case of a single power source FMCW radar or a motion detector for use as a short range sensor, only the noise sideband in the frequency range equal to the reciprocal of four times the round-trip time delay is of concern. The sensitivity of such a radar sensor is only dependent on the auto correlation of the power source with a time delay equal to $2\tau$. The noise sideband affecting the signal-to-noise ratio of a target at 2 feet from the transceiver is the FM noise of the oscillator 62.5 MHz away from the instantaneous frequency.

Based on the foregoing analysis, the noise performance of a FET VCO will be adequate for short-range applications if the AM noise from the LO is suppressed. The 3dB quadrature hybrid coupler 31 is adopted for use as the polarizer in this circularly polarized FMCW system. It has sufficient bandwidth and it is relatively simple to design and fabricate with high-yield. Planar microstrip antennas such as the antenna 33, FIG. 8, are lightweight, economical and easily adaptable to interconnect with the integrated RF transceiver module. Microstrip patch antennas 33 can be batch-fabricated using conventional printed circuit techniques, leading to a reduction in manufacturing cost compared to the commonly used horn antenna. The Schottky diode single balanced mixer 9 using a lumped-element 3dB coupler 8 (FIGS. 6 and 7) is employed in this system because it has the necessary local oscillator AM noise suppression characteristics and is capable of meeting all the operational requirements of the transceiver. The lumped-element design enables minimization of the size of the integrated circuit. In addition, a dc voltage is developed at the output 19 of the balanced mixer 9 (FIGS. 6 and 7) if the transmitted signal is reflected by an object placed right in front of the antenna. This property can be utilized to detect obstacles at close range or the condition of an obscured antenna caused by environmental conditions such as ice or mud covering. The branch line single balanced mixer 9 is simple to fabricate in the microstrip configuration and lends itself well to planar monolithic integration.

Field effect transistor oscillators do not possess the inherent negative resistance properties, as do many of the two-terminal devices. The negative resistance required to cause oscillations in a field effect transistor oscillator has to be simulated by applying suitable feedback from the output to the input of the device.

The most attractive approach for a broadband oscillator is the field effect transistor oscillator operating in common gate configuration. This configuration is attractive because the inherent broadband positive feedback produced by the built-in capacitance between drain and source of the transistor is ideally suitable for tunable oscillator application.

The field effect transistor oscillator is designed for implementation in monolithic technology. Its basic circuit configuration, which includes a common-gate GaAs FET 1a and a varactor diode $C_v$, is shown in FIG. 9. Capacitors $C_1$ and $C_2$, which are often actually internal device capacitances, form a feedback network, feeding a fraction of the output voltage into the input port. Since the output voltage is essentially in phase with the input voltage, the feedback is positive and a negative resistance $(-R_f)$ develops between the drain and the gate terminals, D and G, of the FET 1a. If the feedback resistance $R_f$ is greater than the load resistance $R_L$, oscillations build up in the circuit formed by the field effect transistor 1a, inductance L ($L_1$, $L_2$), capacitance C ($C_1$, $C_2$, $C_S$, $C_V$) and the output resistance load $R_L$. Equilibrium is achieved when, with the onset of saturation, $R_f$ decreases to a value equal to $R_L$, and the total circuit resistance becomes zero. The frequency of oscillation is set by the resonant frequency of the circuit LC Loop with the FET 1a acting as the active source sustaining the loop current.

A FMCW radar transceiver system, as described herein, with a range gate limiting the range of operation will, therefore, be able to take advantage of the low-cost FET-based monolithic integrated circuit technology. The 1f noise is not a problem. The AM noise is easily suppressed, as described above, using a balanced mixer 9 or a saturation amplifier stage 4 following the oscillator, or both.

What is claimed is:

1. A short-range radar transceiver operable over a range in which the sideband noise doe snot obscure the intermediate frequency signal, comprising:

field effect transistor oscillator means for generating at time varying signal;

antenna means for transmitting signals to a target and for receiving signals reflected from a target;

means for coupling said time varying signal to said antenna means to be transmitted therefrom;

a balanced mixer having a first port for receiving said time varying signal and a second port for receiving signals from said antenna means and functioning as an AM noise suppressor, for producing an intermediate frequency signal; and signal processing means responsive to said intermediate frequency signal for producing indications of the range and/or the rate of change of said range of said target.

2. A radar transceiver according to claim 1, comprising:

means responsive to said intermediate frequency signal for limiting the range of operation of said radar transceiver to that within which the sideband noise does not obscure the intermediate frequency signal.

3. The invention according to claim 2, in which:

said means responsive to said intermediate frequency signal comprises a range gate.

4. A radar transceiver according to claim 1, in which: said field effect transistor oscillator means comprises a varactor diode controlled by said signal processing means for tuning said oscillator means.

5. A radar transceiver according to claim 1, in which: said time varying signal of said field effect transistor oscillator means is a constant frequency oscillating signal.

6. A radar transceiver according to claim 4, in which: said field effect transistor oscillator means comprises a common gate field effect transistor circuit.

7. A radar transceiver according to claim 6, in which: said common gate field effect transistor circuit is a monolithic structure on a single crystal semiconductor substrate.

8. A radar transceiver according to claim 7, in which: said common gate field effect transistor circuit comprises a gallium arsenide-field effect transistor.

9. A radar transceiver according to claim 1, in which: said time varying signal is a frequency modulated continuous triangular waveform signal.

10. A radar transceiver according to claim 1, in which: said antenna means comprises a transmitter antenna and a receiver antenna, said transmitter antenna receiving said time varying signal and said receiver antenna being coupled to said second port of said mixer for coupling a received signal to said mixer.

11. A radar transceiver according to claim 10, in which: said transmitter antenna and said receiver antenna are microstrip antennas on a substrate.

12. A radar transceiver according to claim 1, in which: said means for coupling said time varying signal to said antenna means comprises a power splitter for splitting said time varying signal into first and second signals for said antenna means and said mixer.

13. A radar transceiver according to claim 1, in which: said range is less than about 500 feet.

14. A radar transceiver according to claim 1, in which: said range is less than about 30 feet.

* * * * *